United States Patent
To et al.

(10) Patent No.: US 11,244,797 B2
(45) Date of Patent: Feb. 8, 2022

(54) FLYING VEHICLE CURRENT INTERRUPTION DEVICE

(71) Applicant: NIPPON KAYAKU KABUSHIKI KAISHA, Tokyo (JP)

(72) Inventors: Takahiro To, Tokyo (JP); Koichi Sasamoto, Tokyo (JP)

(*) Notice: Subject to any disclaimer, the term of this patent is extended or adjusted under 35 U.S.C. 154(b) by 0 days.

(21) Appl. No.: 17/054,523

(22) PCT Filed: Apr. 23, 2019

(86) PCT No.: PCT/JP2019/017238
§ 371 (c)(1),
(2) Date: Nov. 11, 2020

(87) PCT Pub. No.: WO2019/216204
PCT Pub. Date: Nov. 14, 2019

(65) Prior Publication Data
US 2021/0118637 A1  Apr. 22, 2021

(30) Foreign Application Priority Data
May 11, 2018 (JP) .............................. JP2018-092194

(51) Int. Cl.
*H01H 39/00* (2006.01)
*B64D 25/00* (2006.01)

(52) U.S. Cl.
CPC ............. *H01H 39/00* (2013.01); *B64D 25/00* (2013.01); *H01H 39/006* (2013.01)

(58) Field of Classification Search
CPC ...... B64D 25/00; H01H 39/00; H01H 39/006; H01H 2039/008
See application file for complete search history.

(56) References Cited

U.S. PATENT DOCUMENTS

| | | | | |
|---|---|---|---|---|
| 3,274,363 A * | 9/1966 | McGirr | .................. | H01H 39/00 337/405 |
| 6,556,119 B1 * | 4/2003 | Lell | ...................... | H01H 39/006 337/157 |
| 2010/0328014 A1 * | 12/2010 | Suzuki | ................... | H01H 39/00 337/30 |
| 2013/0056344 A1 * | 3/2013 | Borg | ...................... | H01H 39/00 200/81 R |
| 2013/0175144 A1 * | 7/2013 | Sprenger | .............. | H01H 39/006 200/61.08 |
| 2013/0255463 A1 * | 10/2013 | Ukon | ................... | H01H 39/006 83/639.1 |

* cited by examiner

*Primary Examiner* — Jacob R Crum
(74) *Attorney, Agent, or Firm* — Patshegen IP LLC; Moshe Pinchas

(57) ABSTRACT

Provided is a current breaker for an aerial vehicle that can prevent occurrence of a minor collision of propellers or other components in operation with a person and can prevent occurrence of a deployment failure of a lift generating member at a crash of the aerial vehicle. A current breaker 100 for an aerial vehicle includes a rupture plate 23 that disconnects a current supply path 30 that electrically connects an electric device and an electric circuit, an igniter 10 that damages the rupture plate 23 by directly or indirectly applying a destructive force (heat and pressure) toward the current supply path 30 with respect to the rupture plate 23, and disconnects the current supply path 30 by the rupture plate 23 that has been damaged, and a controller 24 that drives the igniter 10 upon detection of an abnormality.

8 Claims, 11 Drawing Sheets

FLYING VEHICLE CURRENT INTERRUPTION DEVICE

TECHNICAL FIELD

The present invention relates to a current breaker for an aerial vehicle that blocks a current supply to an electric device provided in an aerial vehicle.

BACKGROUND ART

An aerial vehicle such as a drone that has been widespread in recent years is provided with an electric device that operates a plurality of propellers and an electric circuit having a storage battery (current supply source) that supplies a current to the electric device. Supplying a current from the storage battery to the electric device allows the propellers to operate.

Flights of such an aerial vehicle are controlled by the plurality of propellers, but the aerial vehicle may crash if the propellers partially stop operating, for example, due to a gust of wind. Thus, there is a risk of a minor collision of the crashed aerial vehicle with a person, causing injury to the person.

Although not for an aerial vehicle, there has been proposed to provide an electric circuit breaker that blocks a power supply to an electric device if an accident occurs in an electric vehicle in order to prevent an electric leakage and an electric shock due to the accident (see, for example, Patent Literature 1).

Patent Literature 1 discloses an electric circuit breaker that is applied to a vehicle provided with an electric circuit having a converter and a storage battery and that blocks a power supply from the storage battery to the converter upon detection of a collision to the vehicle. This electric circuit breaker is provided with a power supply circuit breaker driven by an explosive actuator that operates upon detection of a vehicle collision. The operation of the power supply circuit breaker disconnects a power supply path electrically connecting the storage battery and the converter.

CITATION LIST

Patent Literature

Patent Literature 1: JP 2011-25912 A

SUMMARY OF INVENTION

Technical Problems

As described above, if the aerial vehicle crashes, a minor collision of the aerial vehicle with a person may occur. If such a minor collision of the aerial vehicle with a person unfortunately occurs, it is necessary to avoid at least a minor collision of the propellers in operation with the person. However, no effective means has been actually proposed for preventing the occurrence of a minor collision of various parts such as propellers in operation with a person at a crash of the aerial vehicle. Further, there has been a risk that the propellers in operation may be entangled with a string member connected to a lift generating member (parachute, paraglider, or the like), and the lift generating member may not be deployed properly.

An object of the present invention is therefore to provide a current breaker for an aerial vehicle that can prevent occurrence of a minor collision of a propeller or other components in operation with a person and can prevent occurrence of a deployment failure of a lift generating member at a crash of the aerial vehicle.

Solutions to Problems (1) A current breaker for an aerial vehicle is used for an aerial vehicle provided with an electric device and an electric circuit having a current supply source that supplies a current to the electric device, and blocks a current supply from the current supply source to the electric device upon detection of an abnormality of the aerial vehicle, the current breaker for an aerial vehicle including a rupture plate that disconnects a current supply path that electrically connects the electric device and the electric circuit, a rupture force source that damages the rupture plate by directly or indirectly applying a rupture force to the rupture plate in a direction toward the current supply path, and disconnects the current supply path by the rupture plate that has been damaged, and a controller that drives the rupture force source upon detection of the abnormality.

In a configuration of (1), the controller drives a destructive force source upon detection of the abnormality of the aerial vehicle. The destructive force source directly or indirectly applies the rupture force (physical force such as heat or pressure) toward the current supply path to the rupture plate. Thus, the rupture plate can be damaged, and the current supply path can be disconnected by the rupture plate that has been damaged and cleaved. The current supply to the electric device of the aerial vehicle can be therefore blocked. This can prevent occurrence of a minor collision of propellers or other components in operation with a person, a fire, an electric shock, and a deployment failure of a lift generating member at a crash of the aerial vehicle. Further, if a part of the propellers is stopped, a flight is usually maintained by controlling a rotation speed of other propellers, but this causes a failure with an excessive load applied to a motor. However, the current supply can be forcibly blocked as described above, and a failure of the motor can be avoided. An igniter, a gas cylinder, a hydraulic cylinder, or the like can be used as the destructive force source. When the igniter is operated as a destructive force source upon detection of the abnormality, heat and pressure due to combustion of explosive are applied to the rupture plate.

(2) In the current breaker for an aerial vehicle of (1), the rupture plate is preferably provided with one or more fragile parts.

In a configuration of (2), the rupture plate is easily damaged by the pressure from the destructive force source. Then, the rupture plate that has been damaged easily disconnects the current supply path.

(3) In the current breaker for an aerial vehicle of (2), the rupture plate is preferably provided such that a central position of the rupture plate substantially coincides with a central axis of the rupture force source, and has a width larger than a width of the rupture force source in a length direction of the current supply path, and the fragile parts of the rupture plate are preferably disposed at an eccentric position of the rupture plate.

In a configuration of (3), a destructive force generated by the destructive force source (for example, heat and pressure generated by the igniter) can damage the rupture plate in a wider range and the cleaved part can be larger than in a mode in which the one or more fragile parts substantially coincide with the central axis of the rupture force source. As a result, the current supply path can be disconnected, and each end of the disconnected current supply path can be wound with a damaged rupture plate. Thus, a clearance of the disconnected part of the current supply path can be increased. This can prevent arc discharge from occurring between one part and the other part of the disconnected current supply path.

(4) The current breaker for an aerial vehicle according to any one of (1) to (3), further including a cup provided between the rupture force source and the rupture plate, disposed so as to cover at least a part of the rupture force source that applies the rupture force, and having a bottom, in which the bottom of the cup is preferably formed into a conical shape so as to be recessed inside, and is preferably displaced toward the rupture plate by receiving the rupture force to transmit the rupture force to the rupture plate.

In a configuration of (4), the pressure generated by the destructive force source can be smaller than when there is no cup. That is, when the destructive force source is, for example, an igniter or a gas cylinder, a used amount of the explosive can be smaller than the case where when there is no cup. Specifically, in this configuration, the bottom of the cup, which is formed in a conical shape, produces the so-called Neumann effect and increases the pressure. This pressure is received by the displaceable bottom of the cup, and the bottom can increase the pressure to a force capable of damaging the rupture plate and can transmit the pressure to the rupture plate. As a result, cost reduction can be achieved when the destructive force source is an igniter or a gas cylinder type.

(5) As another aspect, the current breaker for an aerial vehicle according to any one of (1) to (3), further including a cylinder provided between the rupture force source and the rupture plate, disposed so as to cover at least a part of the rupture force source that applies the rupture force, and having a bottom, in which the one or more fragile parts are preferably provided on the bottom of the cylinder.

In a configuration of (5), a target of the destructive force generated by the destructive force source can be restrained by the cylinder, and thus the destructive force is easily applied to the rupture plate while suppressing a destructive force loss.

(6) As another aspect, the current breaker for an aerial vehicle according to any one of (1) to (3), further including a cylinder provided between the rupture force source and the rupture plate, disposed so as to cover at least a part of the rupture force source that applies the rupture force, and having an opening at a tip of the cylinder, in which the one or more fragile parts are preferably provided on the bottom of the cylinder.

In the configuration of (5), a direction of the destructive force generated by the destructive force source can be regulated by the cylinder, and thus the destructive force is easily applied to the rupture plate while suppressing the destructive force loss.

(7) In the current breaker for an aerial vehicle according to any one of (1) to (6), an insulating material is preferably provided between the rupture plate and the current supply path.

In a configuration of (7), the insulating material is supplied onto the current supply path by receiving the destructive force together with or from the rupture plate. This ensures an insulation property of the current supply path. The reliability of the current breaking is thus improved.

(8) In the current breaker for an aerial vehicle of (7), the insulating material is preferably held on a lower surface of the rupture plate.

A configuration of (8) eliminates the need for providing another member that holds the insulating material.

(9) The current breaker for an aerial vehicle of the present invention is used for an aerial vehicle provided with an electric device and an electric circuit having a current supply source that supplies a current to the electric device, and blocks a current supply from the current supply source to the electric device upon detection of an abnormality of the aerial vehicle, the current breaker for an aerial vehicle including an insulating material, a destructive force source that disconnects a current supply path that electrically connects the electric device and the electric circuit by applying a pressure to the current supply path, and releases the insulating material toward the current supply path that has been disconnected by applying the pressure to the insulating material, and a controller that drives the destructive force source upon detection of the abnormality.

In a configuration of (9), the controller drives a destructive force source upon detection of the abnormality of the aerial vehicle. This destructive force source can disconnect the current supply path by applying the destructive force (physical force such as heat or pressure) to the current supply path. The current supply to the electric circuit can be therefore blocked. This can prevent occurrence of a minor collision of propellers or other components in operation with a person, a fire, an electric shock, and a deployment failure of a lift generating member at a crash of the aerial vehicle. Further, if a part of the propellers is stopped, a flight is usually maintained by controlling a rotation speed of other propellers, but this causes a failure with an excessive load applied to a motor. However, the current supply can be forcibly blocked as described above, and a failure of the motor can be avoided. Further, the destructive force source can release the insulating material toward the current supply path by applying the pressure to the insulating material. This can improve the reliability of the current breaking. An igniter, for example, can be used as the destructive force source. The igniter is operated upon detection of the abnormality, and thus heat and pressure are generated by combustion of the explosive. The heat and pressure are applied to the current supply path and the insulating material.

(10) In the current breaker for an aerial vehicle according to (9), the destructive force source is preferably an igniter.

In a configuration of (10), the destructive force source can be activated instantly and a weight of the destructive force source can be reduced.

(11) The current breaker for an aerial vehicle of the present invention is used for an aerial vehicle provided with an electric device and an electric circuit having a current supply source that supplies a current to the electric device, and blocks a current supply from the current supply source to the electric device upon detection of an abnormality of the aerial vehicle, the current breaker for an aerial vehicle including a rupture force source that disconnects a current supply path including a copper plate that electrically connects the electric device and the electric circuit by applying a rupture force to the current supply path in a direction toward the current supply path, and a controller that drives the rupture force source upon detection of the abnormality.

In a configuration of (11), the controller drives a destructive force source upon detection of the abnormality of the aerial vehicle. This destructive force source can disconnect the current supply path by applying a destructive force (physical force such as heat or pressure) to the current supply path. The current supply to the electric circuit can be therefore blocked. This can prevent occurrence of a minor collision of propellers or other components in operation with a person, a fire, an electric shock, and a deployment failure of a lift generating member at a crash of the aerial vehicle.

Further, if a part of the propellers is stopped, a flight is usually maintained by controlling a rotation speed of other propellers, but this causes a failure with an excessive load applied to a motor. However, the current supply can be forcibly blocked as described above, and a failure of the motor can be avoided. An igniter, for example, can be used as the destructive force source. The igniter is operated upon detection of the abnormality, and thus heat and pressure are generated by combustion of the explosive. The heat and pressure are applied to the current supply path.

Advantageous Effects of Invention

Provided in the present invention is a current breaker for an aerial vehicle that can prevent occurrence of a minor collision of propellers or other components in operation with a person, a fire, an electric shock, and a deployment failure of a lift generating member at a crash of an aerial vehicle.

DESCRIPTION OF EMBODIMENTS

Hereinafter, a current breaker for an aerial vehicle according to embodiments of the present invention will be described with reference to the drawings. The current breaker for an aerial vehicle according to the present embodiments is used for an aerial vehicle provided with an electric device and an electric circuit having a current supply source that supplies a current to the electric device, and blocks a current supply from the current supply source to the electric device upon detection of an abnormality such as a fall of the aerial vehicle. In the present invention, there is no particular limitation to the current supply source. However, examples of the current supply source include a current supply source using Li-ion battery, Li—Po battery, fuel cell, hydrogen fuel, gasoline, gas, or sunlight as a generation source, or a generator.

First Embodiment

Figure 1:
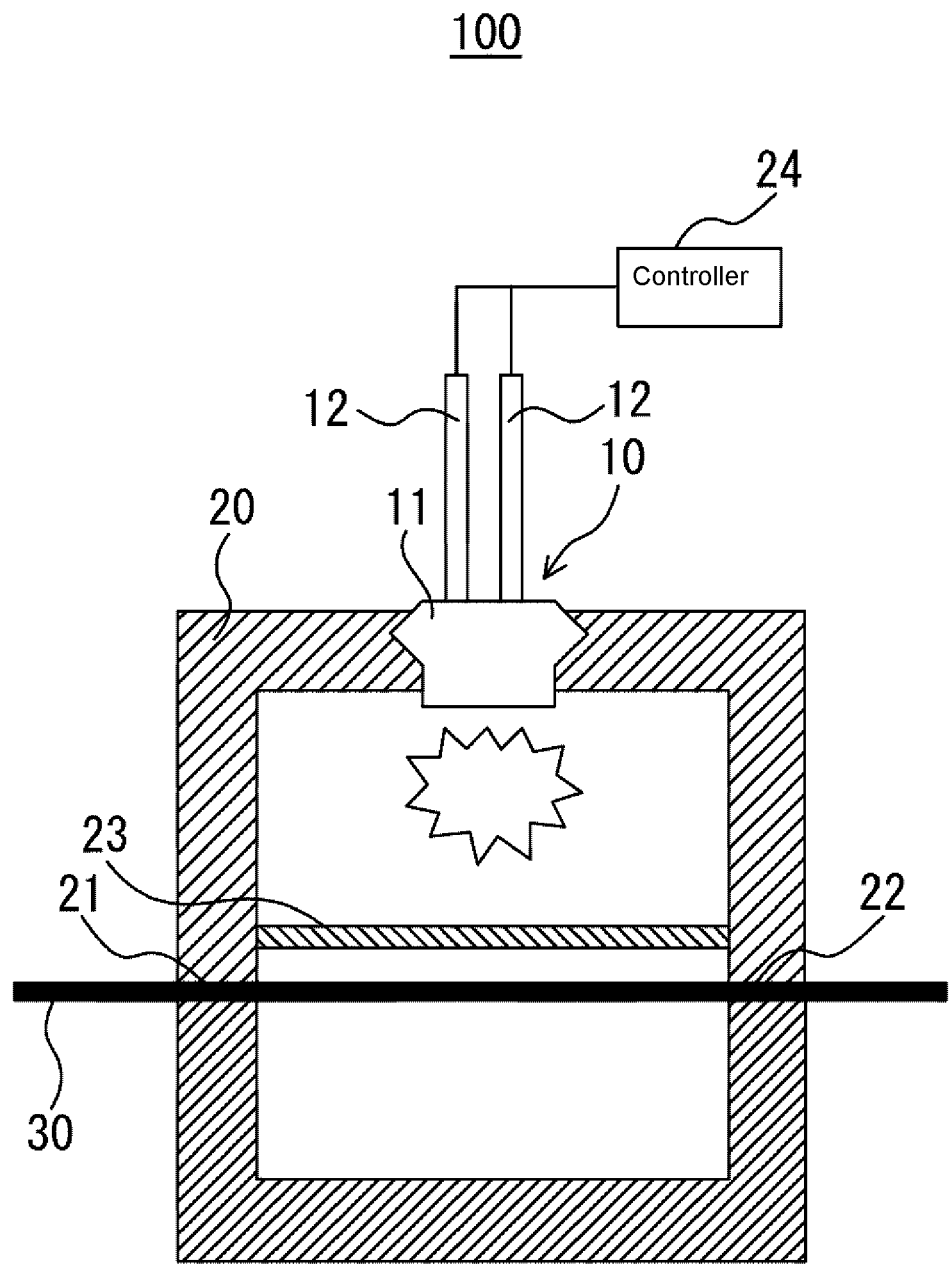
FIG. 1 is a sectional view showing a current breaker for an aerial vehicle according to a first embodiment of the present invention.

As shown in FIG. 1, a current breaker 100 for an aerial vehicle according to the present embodiment includes an igniter 10 which is one example of a destructive force source (force source), a disconnecting chamber 20 having an internal space, a rupture plate 23 that is damaged and cleaved due to an application of heat and pressure generated by an operation of the igniter 10 and disconnects a current supply path 30, and a controller 24 that drives the igniter 10 upon detection of an abnormality of the aerial vehicle.

As the igniter 10, a known igniter can be used. The igniter 10 generates a flame, and includes an ignition part 11 including ignition charge (not shown) that generates a flame by igniting the inside thereof and combusting during operation and a resistor (not shown) that ignites the ignition charge, and a pair of terminal pins 12 and 12 connected to the ignition part 11.

The rupture plate 23 is formed, for example, in a circular shape in plan view, and is provided inside the disconnecting chamber 20 and below the igniter 10. The rupture plate 23, which needs to be easy to be cleaved and needs an appropriate strength, can be configured by a lightweight metal such as iron or aluminum. Further, the rupture plate 23 may be configured by a non-conductive material, for example, a hard resin material such as ebonite, or fine ceramics.

The rupture plate 23 has a width larger than a width of the igniter 10 in a lengthwise direction of the current supply path 30. The igniter 10 is held on an upper wall of the disconnecting chamber 20 such that the generated flame can be discharged toward the rupture plate 23 located below.

Upon detection of an abnormality of the aerial vehicle, a predetermined amount of current flows through the resistor through the pair of terminal pins 12 and 12 under control of the controller 24. When a current flows through the resistor, Joule heat is generated in the resistor, and the ignition charge starts combustion. The high-temperature flame generated by the combustion causes a squib cup (not shown) storing the ignition charge to be cleaved. In the igniter 10, time until a start of the operation after the current flowing through the resistor is generally 2 milliseconds or less when a nichrome wire is used for the resistor.

A through hole 21 is provided in a peripheral wall of the disconnecting chamber 20, and a through hole 22 is provided in another part of the peripheral wall. The current supply path 30 is bridged through the through holes 21 and 22. The current supply path 30 is configured by, for example, a metal plate or a metal wire, one end of which is connected to a storage battery (not shown) of an electric circuit, and the other end of which is connected to an electric device (not shown) of the aerial vehicle.

Figure 2:
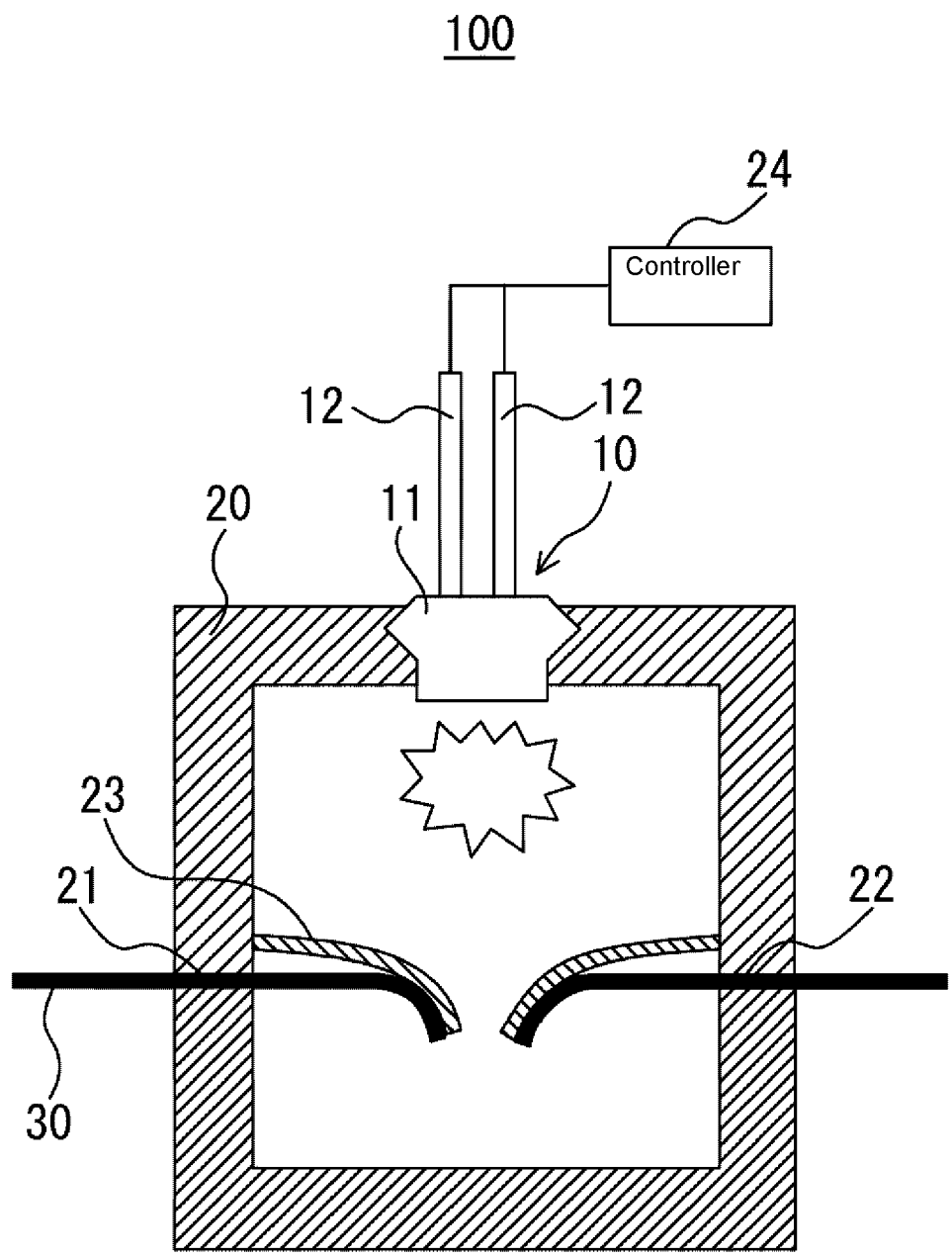
FIG. 2 is a diagram showing a state in which a current supply path in FIG. 1 is disconnected by a rupture plate.

In the above configuration, when a predetermined amount of current is supplied to the pair of terminal pins 12 and 12 of the igniter 10 by the control of the controller 24 upon detection of an abnormality of the aerial vehicle, the rupture plate 23 is damaged by the heat and pressure generated by the operation of the ignition part 11. In this case, the rupture plate 23 is damaged such that a central part thereof is cleaved so as to be bent toward the current supply path 30. Then, the current supply path 30 is disconnected as shown in FIG. 2 by the rupture plate 23 damaged as described above. In the present invention, a target of the current supply path 30 to be blocked is preferably wiring from a positive electrode part.

As described above, in the current breaker 100 for an aerial vehicle according to the present embodiment, the controller 24 activates the igniter 10 as a destructive force source upon detection of an abnormality of the aerial vehicle. The igniter 10 applies heat and pressure toward the current supply path 30 to the rupture plate 23. Thus, the rupture plate 23 can be damaged and cleaved, and the current supply path 30 can be disconnected by a cleaved part of the rupture plate 23. This makes it possible to block the current supply to the electric device of the aerial vehicle. This can prevent occurrence of a minor collision of propellers or other components in operation with a person, a fire, an electric shock, and a deployment failure of a lift generating member at a crash of the aerial vehicle. Further, if a part of the propellers is stopped, a flight is usually maintained by controlling a rotation speed of other propellers, but this causes a failure with an excessive load applied to a motor. However, the current supply can be forcibly blocked as described above, and a failure of the motor can be avoided.

Second Embodiment

Next, a current breaker for an aerial vehicle according to a second embodiment will be described with reference to the drawings.

Figure 3:
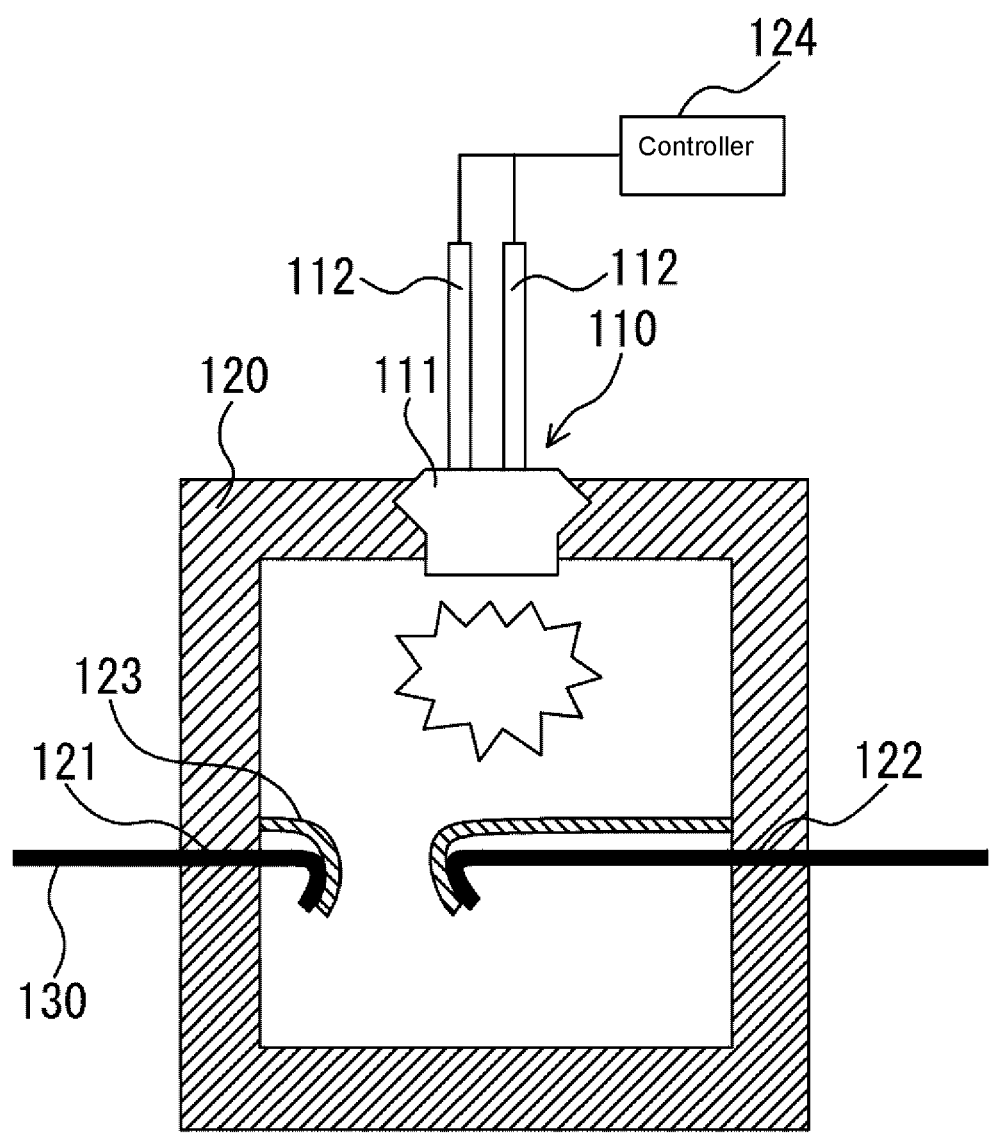
FIG. 3 is a sectional view showing a current breaker for an aerial vehicle according to a second embodiment of the present invention.

FIG. 3 is a sectional view showing a current breaker 200 for an aerial vehicle according to the second embodiment. In FIG. 3, parts denoted by the reference signs having the same last two digits as those in FIG. 1 are similar to those described with reference to FIG. 1, unless otherwise indicated, and a description thereof will be omitted. The same applies to the drawings in the following embodiments.

Figure 4:
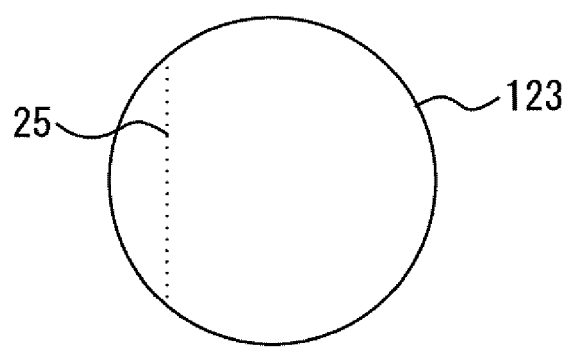
FIG. 4(a) is a plan view showing one example of a fragile part of the rupture plate in FIG. 3.
FIG. 4(b) is a plan view showing a modified example of the fragile part of the rupture plate.
Figure 4:
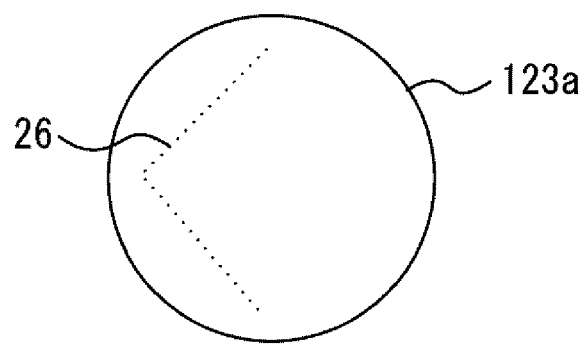

In the current breaker 200 for an aerial vehicle in FIG. 3, a rupture plate 123 is provided with a fragile part. Specifically, as shown in FIG. 4(a), the rupture plate 123 is provided with a fragile part 25 disposed at a position of a central axis of the rupture plate 123, in other words, a position apart from a position of the central axis of the igniter 110 (see FIG. 3) (a position that does not pass through the position of the central axis and is an eccentric position of the rupture plate 123). A plurality of the fragile parts 25 may be provided.

In this way, in the current breaker 200 for an aerial vehicle according to the present embodiment, the rupture plate 123 is easily damaged and cleaved by the pressure of the igniter 110. Then, the cleaved part of the rupture plate 123 that has been cleaved easily disconnects a current supply path 130.

In the current breaker 200 for an aerial vehicle, the fragile part 25 of the rupture plate 123 is disposed at the position apart from the position of the central axis of the igniter 110 (position that does not pass through the position of the central axis). Thus, the pressure of the igniter 110 is more likely to be received by the entire fragile part than in a mode in which the fragile part is located directly below the igniter 110. Therefore, the rupture plate 123 can be damaged in a wider range and the cleaved part can be larger than in the mode in which the fragile part is located directly below the igniter 110. Consequently, as shown in FIG. 3, when the current supply path 130 is disconnected, ends of the disconnected current supply path 130 can be wound by the cleaved rupture plate 123, and thus a clearance of the disconnected part of the current supply path 130 can be increased. This can prevent arc discharge from occurring between one part and the other part of the disconnected current supply path.

As shown in FIG. 4(b) instead of FIG. 4(a), a fragile part 26 in which one straight line is bent in a V shape may be provided in a rupture plate 123a. In this case, the fragile part 26 is disposed at a position that does not pass through a position of a central axis of the rupture plate 123a and is apart from the position of the central axis. The rupture plate in FIG. 4(b) is easier to be cleaved than in the case of FIG. 4(a), and is thus easier to disconnect the current supply path 30.

Third Embodiment

Next, a current breaker for an aerial vehicle according to a third embodiment will be described with reference to the drawings.

Figure 5:
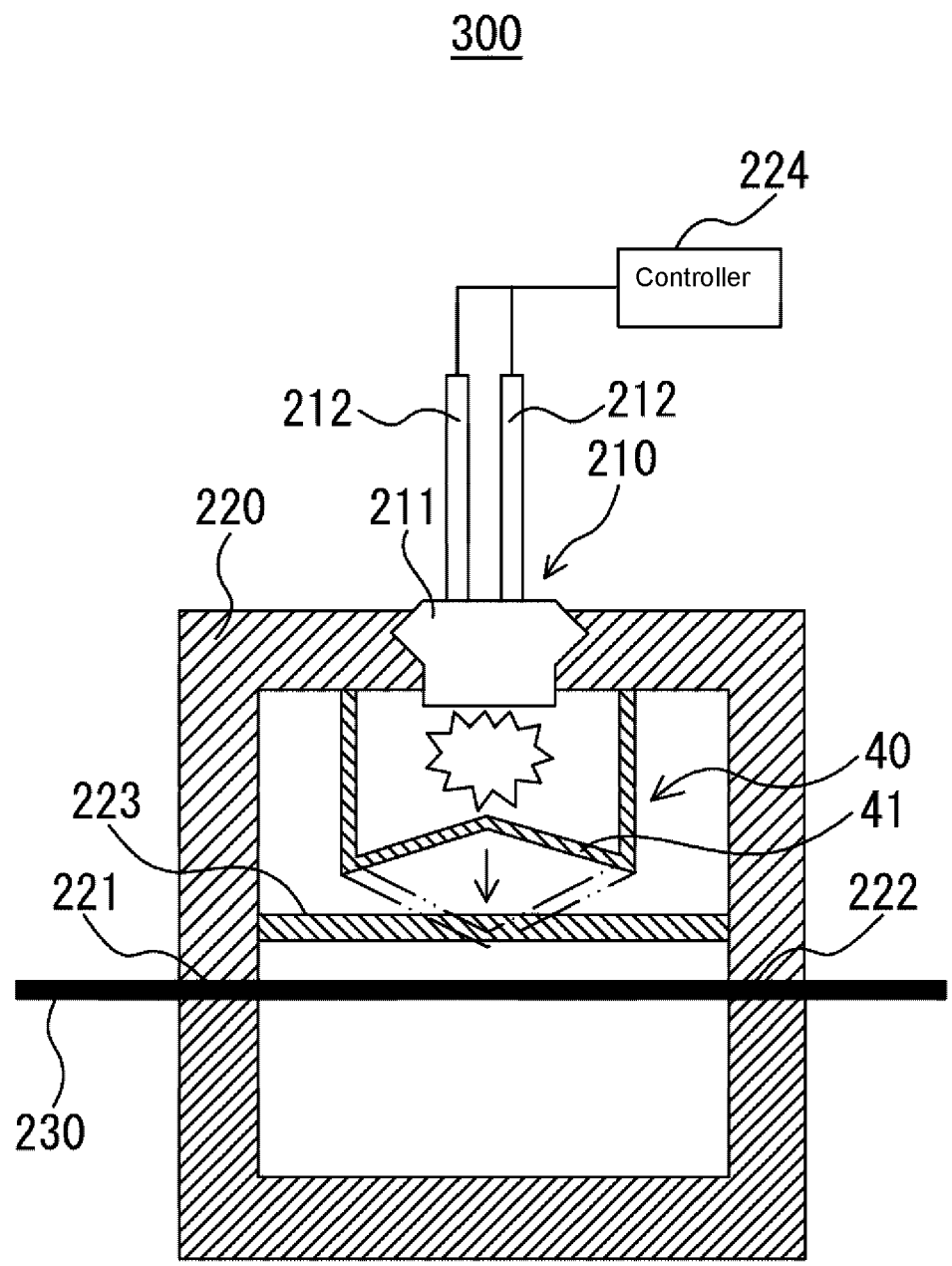
FIG. 5 is a sectional view showing a current breaker for an aerial vehicle according to a third embodiment of the present invention.

FIG. 5 is a sectional view showing a current breaker 300 for an aerial vehicle according to the third embodiment. The current breaker 300 for an aerial vehicle in FIG. 5 includes a cup 40 provided between an igniter 210 and a rupture plate 223 and disposed so as to cover at least a part of the igniter 210 that applies pressure. The cup 40 has a bottom 41 formed in a conical shape so as to be sharpened upward (to be recessed inside) in an initial state.

In such a configuration, by receiving pressure from the igniter 210, the bottom 41 is displaced toward the rupture plate 223, deformed downward into a convex shape as indicated by the chain double-dashed line in FIG. 5, is cleaved, and thereby indirectly transmits the pressure to the rupture plate 223. A method of disconnecting the current supply path 230 by the rupture plate 223 that receives pressure is the same as in FIG. 1 described above.

In the current breaker 300 for an aerial vehicle according to the present embodiment, in an attempt to obtain the same pressure as in the first embodiment, the pressure generated in the igniter 210 can be smaller than that in the first embodiment. That is, in an attempt to obtain the same pressure as in the first embodiment, an amount of the explosive used in the igniter 210 can be smaller than in the first embodiment. Specifically, in this configuration, the bottom 41 of the cup 40, which is formed in a conical shape, produces the so-called Neumann effect and increases the pressure. This pressure of the igniter 210 is received by the displaceable bottom 41 of the cup 40, and the bottom 41 can increase the pressure to a force capable of damaging and cleaving the rupture plate 223 and transmit the pressure to the rupture plate 223. As a result, cost reduction of the igniter 210 (cost reduction of the explosive of the igniter 210) can be achieved as compared with the case of the first embodiment.

Fourth Embodiment

Next, a current breaker for an aerial vehicle according to a fourth embodiment will be described with reference to the drawings.

Figure 6:
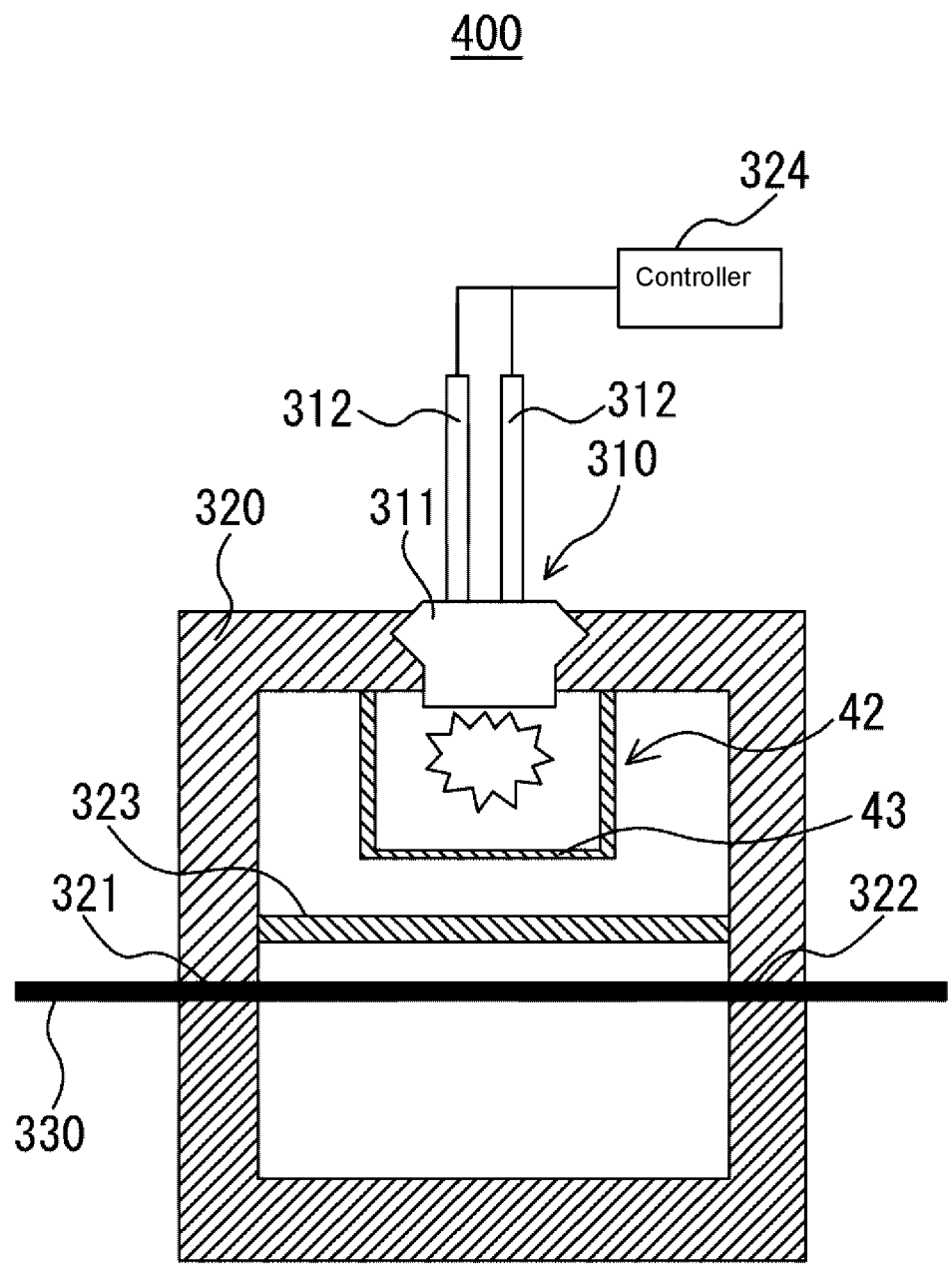
FIG. 6 is a sectional view showing a current breaker for an aerial vehicle according to a fourth embodiment of the present invention.

FIG. 6 is a sectional view showing a current breaker 400 for an aerial vehicle according to the fourth embodiment. The current breaker 400 for an aerial vehicle in FIG. 6 includes a cylinder 42 provided between an igniter 310 and a rupture plate 323, disposed so as to cover at least a part of the igniter 310 that applies pressure and having a bottom 43.

Figure 7:
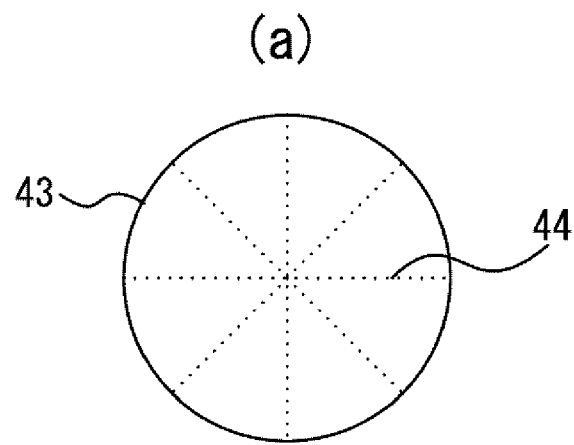
FIG. 7(a) is a plan view showing one example of a fragile part on a bottom of a cylinder in FIG. 6, and FIGS. 7(b) and 7(c) are plan views showing modified examples of the fragile part.
Figure 7:
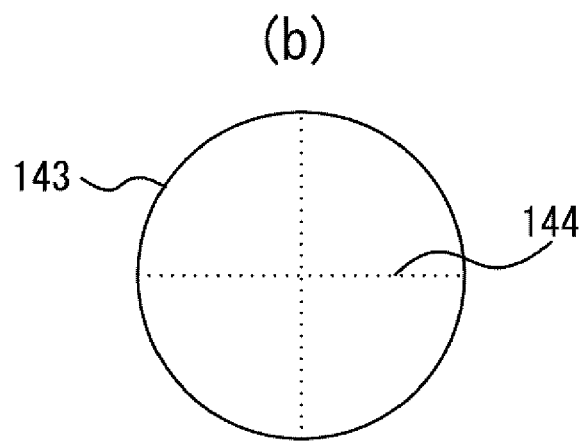
Figure 7:
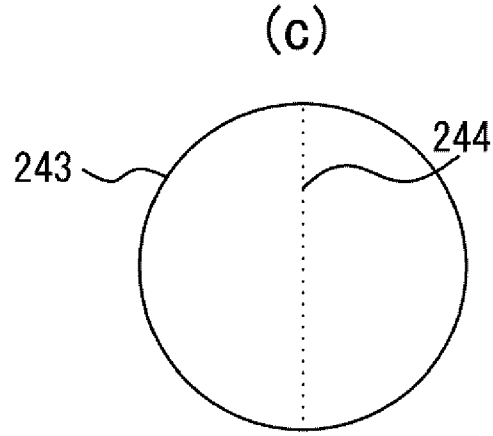

As shown in FIG. 7(a), the bottom 43 of the cylinder 42 is provided with one or more fragile parts 44. These fragile parts 44 are radially disposed with respect to a center of the bottom 43 formed in a circular shape in plan view. Similarly, as shown in FIG. 7 (b), a bottom 143 may be provided with a plurality of fragile parts 144. Alternatively, as shown in FIG. 7 (c), a bottom 243 may be provided with one fragile part 244.

In the current breaker 400 for an aerial vehicle according to the present embodiment, a target of the pressure generated by the igniter 310 can be restrained by the cylinder 42, and thus the pressure is easily applied to the rupture plate 323 while suppressing a pressure loss. Further, the pressure of which the pressure loss is suppressed can damage the rupture plate 323, and a high pressure from the rupture plate 323 can easily disconnect a current supply path 330.

Fifth Embodiment

Next, a current breaker for an aerial vehicle according to a fifth embodiment will be described with reference to the drawings.

Figure 8:
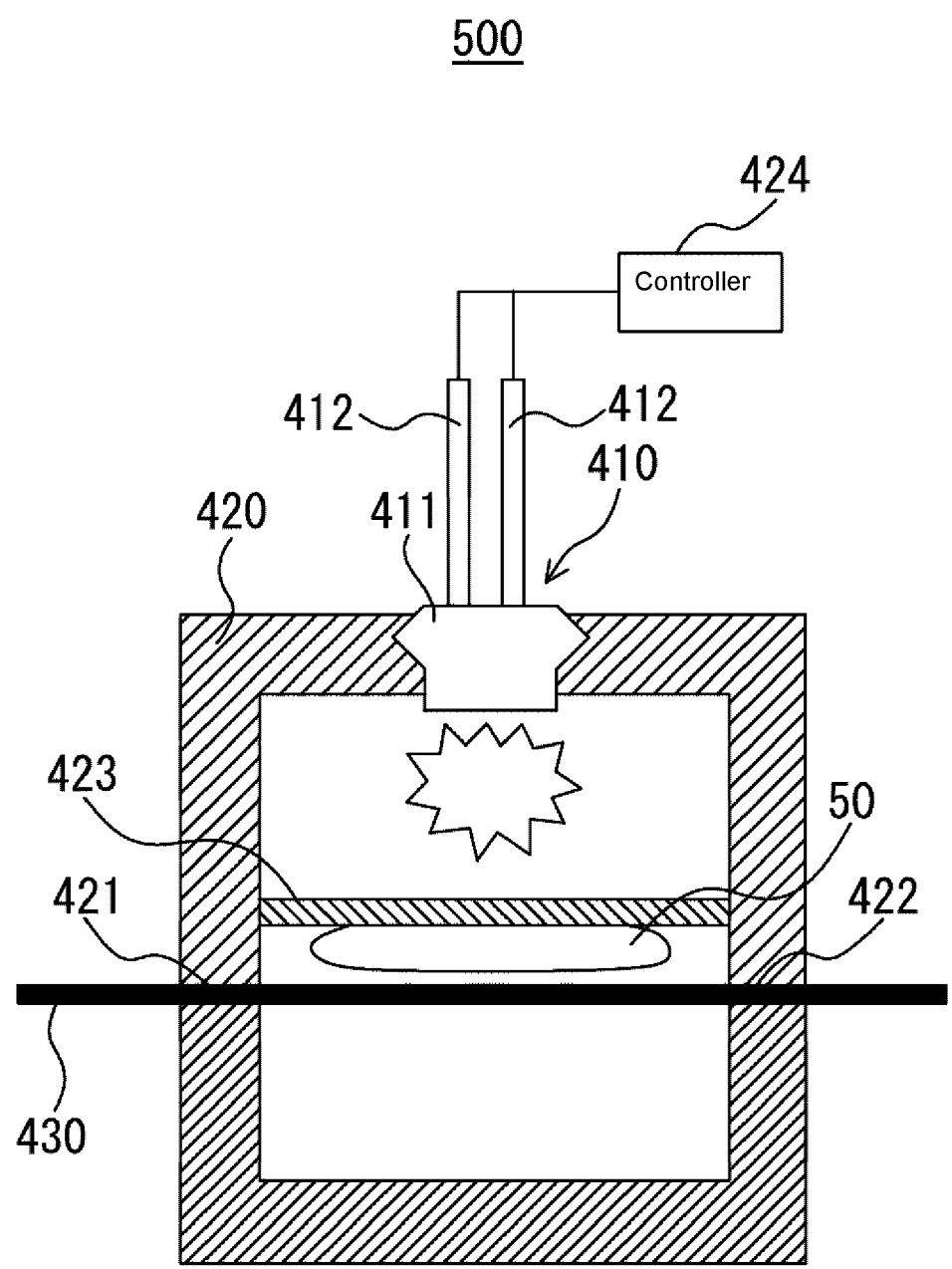
FIG. 8 is a sectional view showing a current breaker for an aerial vehicle according to a fifth embodiment of the present invention.

FIG. 8 is a sectional view showing a current breaker 500 for an aerial vehicle according to the fifth embodiment. In the current breaker 500 for an aerial vehicle in FIG. 8, an insulating material 50 is held on a surface of a rupture plate 423 on a side of a current supply path 430.

In general, a compound having a low dielectric constant is preferable as the insulating material 50. For example, the insulating material 50 is preferably a polymer material, a resin material, a hydrocarbon, or the like.

Examples of the polymer material include polyamide, polyethylene, polyisobutylene, polyvinyl chloride, polychlorotrifluoroethylene, polyvinyl acetate, polyacrylate, polystyrene, polyethylene terephthalate, polycarbonate, polyphenylene ether, polyphenylene oxide resin, modified polyphenylene ether (m-PPE), ethylene tetrafluoroethylene copolymer, polyvinylidene fluoride, polypropylene, polymethylpentene, polyphenylene sulfide, polybutylene terephthalate, polybutylene, polycaprolactam, polymonochloro, polystyrol, polysulfonic acid, polyvinyl alcohol, cellulose acetate, cellulose nitrate, ethyl cellulose, dextrin, polystyrene pellets, polypropylene pellets, and polyethylene pellets.

Examples of the resin material include alkyd resin, epoxy resin, tetrafluoroethylene resin, vinyl fluoride resin, phenol resin, urea resin, melamine resin, unsaturated polyester resin, vinyl ester resin, diallyl phthalate resin, epoxy resin, silicone resin, xylene resin, amino resin, aniline resin, guanamine resin, acrylic resin, polyetherimide resin, acrylonitrile butadiene styrene (ABS) resin, ETFE resin, fluororesin, PET resin, polyacetal resin, polyamideimide resin, polyimide resin, polyurethane resin, PEK resin, polyether sulfone resin, polyetherimide resin, polyolefin resin, polytetrafluoroethylene resin, isobutyl resin, and PEEK resin.

Examples of the hydrocarbon include cycloheptasiloxane, cyclohexane, cyclopentane, decane, decylene, dimethylpentane, dimethyl-2-hexane, dimethylheptane, dimethylpentane, 2-methyl-2-butene, butane, kerosene, isooctane, gasoline, dipentene, styrene, xylene, menthol, hexane, naphthalene, pentadiene, pentane, liquefied petroleum gas, dodecane, dodecyne, ethylene pentane, petrolatum, xylene, turpentine oil, undecane, docosane, cis-3-hexane, acetylene, dichlorostyrene, ethylcyclobutane, heptane, hexylene, methylcyclopentane, trimethyl-3-heptene, octane, trans-3-hexyne, methylbutane, and microhexane.

Further, as other examples of the insulating material 50, an aromatic compound, a halogen compound, and a gas stored in a predetermined container can be used.

Examples of the aromatic compound include benzene, ethyltoluene, isobutylbenzene, diphenylmethane, diphenylethane, diphenyl, isopropylbenzene, cumene, thiophene, trimethylbenzene, trinitrobenzene, decahydronaphthalene, triphenylmethane, cymene, dichlorobenzene, limonene, camphene, diethyl succinyl succinate, dimethylquinoxaline, dioxane, eugenol, mesitylene, nitrotoluene, nonane, cymene, phenanthrene, phenylurethane, phenylethylene, propylbenzene, 1,2,4-trimethylbenzene, quinoline, and terpineol.

Examples of the halogen compound include hydrogen arsenide, bromine, chlorine, fluorine, boron bromide, Freon, trichloropropane, and naphtha.

Examples of the gas include argon, carbon dioxide, carbon disulfide, dinitrogen monoxide, dinitrogen tetraoxide, nitrogen, liquid air, hydrogen, methane, deuterium, oxygen, nitrous oxide, sulfur hexafluoride, fluorocarbon, and carbon dioxide.

Further, other examples of the insulating material 50 include aluminum powder, ammonia, carbon tetrachloride, cholesterol, isoprene, lead acetate, lead tetrachloride, mercury, diethyl mercury, phosphorus, phosphorus pentachloride, diethyl zinc, copper oleate, cordierite, cotton, aluminum hydroxide, aluminum oleate, asphalt, diimylamine, diisoamyl, diisoamylene, aluminum fluoride, caproic acid, caprolactam, cyclohexanecarboxylic acid, decamethylcyclopentasiloxane, decamethyltetrasiloxane, diisopropylamine, dodecamethyl cyclohexasiloxane, dodecamethylpentasiloxane, ebonite, ethylene tetrafluoride, ferric oleic acid, ferrochrome, fly ash, acid clay, germanium tetrachloride, enanthate, hexamethyldisiloxane, hydrocyanic acid, isovaleric acid, isobutyric acid, isophthalic acid, isopropylamine, linoleic acid, methylal, micanite, butyl formate, butyl acetate, octamethylcyclotetrasiloxane, oleic acid, palmitic acid, cycloparaffin, paraffin, chlorinated paraffin, perlite, phenyl-1 propane, aluminum silicate, silicon tetrachloride, silicon oil, sodium oleate, sodium phosphate, stearic acid, stearin, tetrachloroethylene, tetrafluoroethylene, tetranitromethane, titanium chloride, triethylaminium, zinc oxide (II), valeric acid, shell sand, ferrosilicon, nitrogen (liquid), ferrite (powder), iron (II) oxide, Tokusil, terecuric acid, terephthalic acid, granulated sugar (powder), PVC fluid, PE cube, calcium carbonate, polycarbonate powder, propane (liquid), cevine, talc, calcium hypochlorite, and calcium phosphate.

Among the insulating materials 50 as described above, a thermosetting resin that is cured by heat of the explosive and can block the disconnected part of the current supply path 430 is more preferable. Therefore, as the insulating material 50, phenol resin, melamine resin, urea resin, epoxy resin, unsaturated polyester resin, alkyd resin, silicone resin, urethane resin, diallyl phthalate resin, furan resin, ketone resin, xylene resin, polyimide resin, polybismaleimide triazine, (benzo)guanamine resin, and vinyl ester resin are preferable, and epoxy resin having good adhesiveness to a metal is more preferable. Further, in the above epoxy resin, there are a one-component epoxy resin in which a curing agent included in the agent reacts to be cured by heating, and a two-component epoxy resin in which the agent and the curing agent are mixed to be cured. The one-component epoxy resin starts to be cured when heat is applied, and thus may be solidified when exposed to direct sunlight in the sky and becomes hot. However, the one-component epoxy resin does not require two containers, and thus has an advantage of being lightweight and compact. On the other hand, the two-component epoxy resin is not cured when heat is applied, and thus can reliably hold the initial state for a long period of time. It is therefore desirable to appropriately select the one-component or two-component epoxy resin depending on the use.

Figure 9:
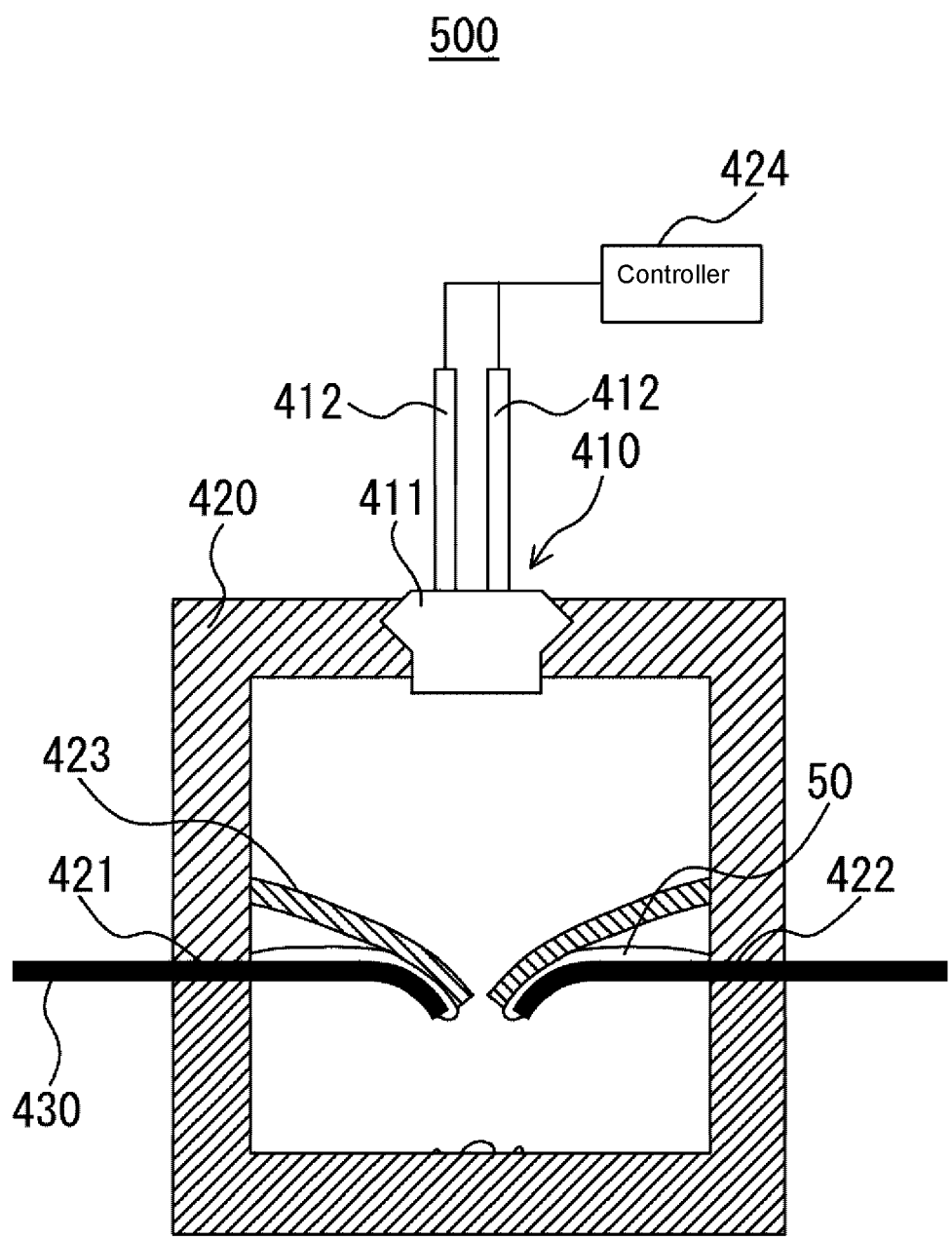
FIG. 9 is a diagram showing a state in which a current supply path in FIG. 8 is disconnected by a rupture plate.

In this current breaker 500 for an aerial vehicle, the insulating material 50 receives pressure by an igniter 410 together with or from the rupture plate 423, and thereby is supplied onto the current supply path 430 disconnected by the rupture plate 423 as shown in FIG. 9 As a result, the disconnected and separated current supply path 430 is covered with the insulating material 50, and an insulation property of the disconnected and separated current supply path 430 is secured. This can further improve the reliability of the current breaking in the current breaker 500 for an aerial vehicle.

Sixth Embodiment

Next, a current breaker for an aerial vehicle according to a sixth embodiment will be described with reference to the drawings.

Figure 10:
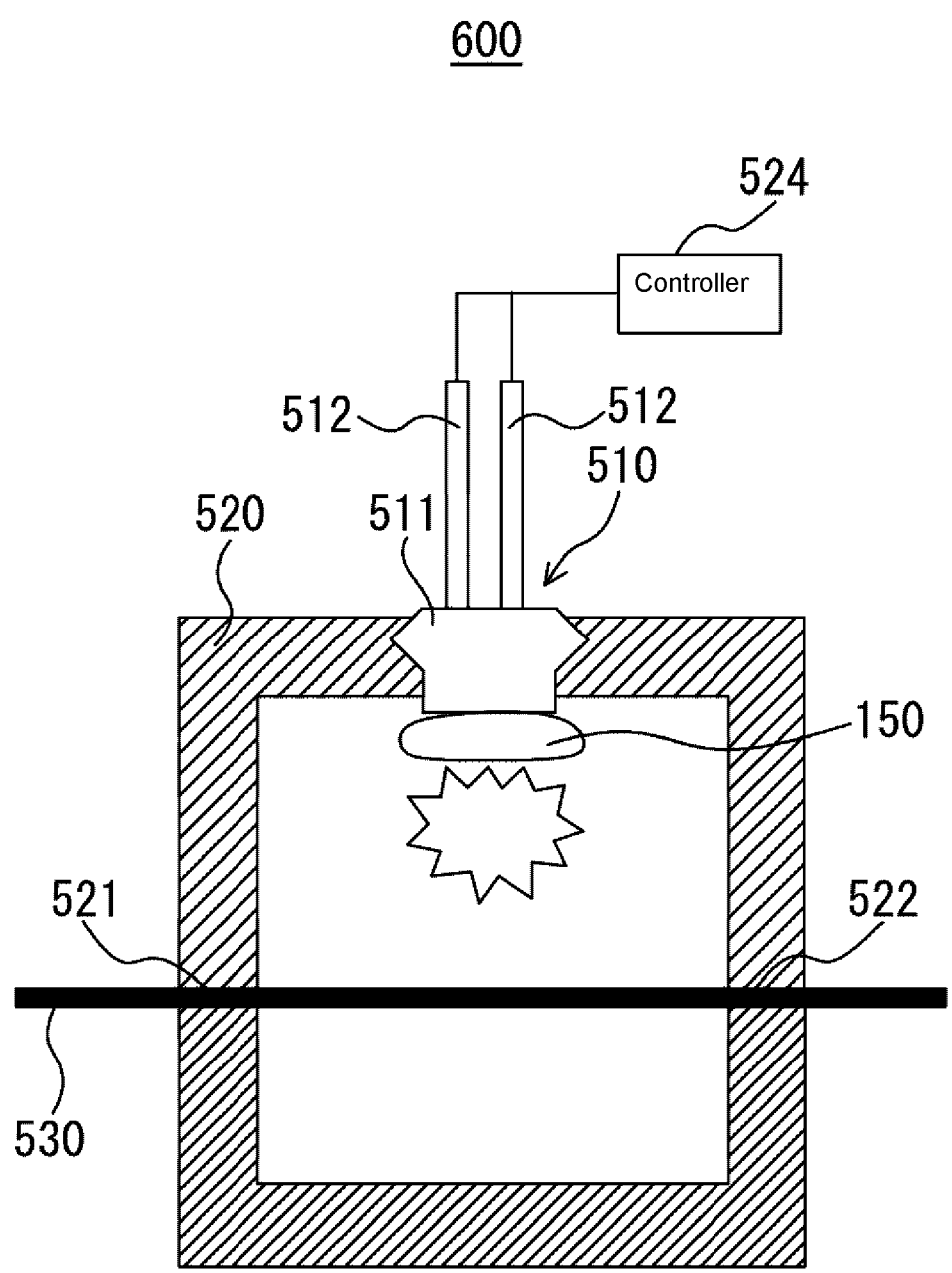
FIG. 10 is a sectional view showing a current breaker for an aerial vehicle according to a sixth embodiment of the present invention.

FIG. 10 is a sectional view showing a current breaker 600 for an aerial vehicle according to the sixth embodiment. In a current breaker 600 for an aerial vehicle in FIG. 10, the rupture plate is not provided, and an insulating material 150 is held below an igniter 510.

In this current breaker 600 for an aerial vehicle, by receiving pressure from the igniter 510, the insulating material 150 is supplied (released) onto a current supply path 530 which is disconnected by similarly receiving pressure from the igniter 510. As a result, similarly to the fifth embodiment, the disconnected and separated current supply path 530 is covered with the insulating material 150, and an insulation property of the disconnected and separated current supply path 530 is ensured. This can further improve the reliability of the current breaking in the current breaker 600 for an aerial vehicle.

Seventh Embodiment

Next, the current breaker for an aerial vehicle according to a seventh embodiment will be described with reference to the drawings.

Figure 11:
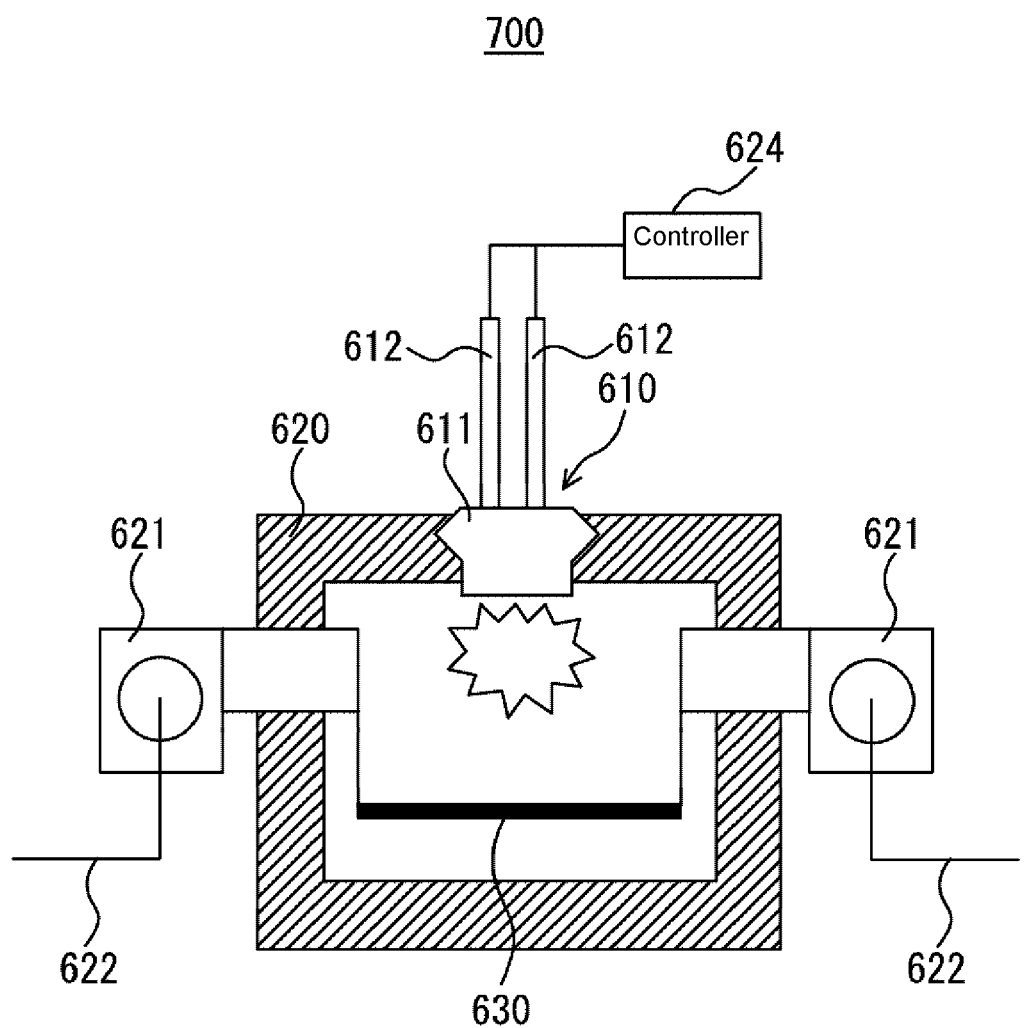
FIG. 11 is a sectional view showing a current breaker for an aerial vehicle according to a seventh embodiment of the present invention.

FIG. 11 is a sectional view showing a current breaker 700 for an aerial vehicle according to the seventh embodiment. In the current breaker 700 for an aerial vehicle in FIG. 11, the rupture plate and the insulating material are not provided. In the present embodiment, a current supply path 630 includes a copper plate (bus bar), and one end and the other end thereof are each connected to a terminal 622 of a terminal board 621.

In the current breaker 700 for an aerial vehicle, a controller 624 drives an igniter 610 as a destructive force source upon detection of an abnormality of the aerial vehicle. The igniter 610 can disconnect the current supply path 630 by applying a destructive force (physical force such as heat or pressure) to the current supply path 630. The current supply to the electric circuit can be therefore blocked. This can prevent occurrence of a minor collision of propellers or other components in operation with a person, a fire, an electric shock, and a deployment failure of a lift generating member at a crash of the aerial vehicle. Further, if a part of the propellers is stopped, a flight is usually maintained by controlling a rotation speed of other propellers, but this causes a failure with an excessive load applied to a motor. However, the current supply can be forcibly blocked as described above, and a failure of the motor can be avoided.

As described above, the embodiments of the present invention have been described with reference to the drawings. However, the specific configuration of the present invention shall not be interpreted as to be limited to the above described embodiments. The scope of the present invention is defined not by the above embodiments but by claims set forth below, and shall encompass the equivalents in the meaning of the claims and every modification within the scope of the claims.

In the above embodiments, the igniter is used as the rupture force source, but the present invention is not limited thereto. For example, another rupture force source may be used such as a hydraulic cylinder type that receives a command signal from the controller to operate a hydraulic cylinder to generate a destructive force (that drives a piston or the like to damage the rupture plate or scatter the insulating material), or a gas cylinder type that receives a command signal of the controller and opens a gas cylinder to generate a destructive force (pressure) similar to the igniter.

Further, the conical bottom 41 according to the third embodiment may be provided with the fragile part as shown in FIGS. 7(a) to 7(c). This makes it possible to destruct the bottom 41 smoothly, and damage and cleave the rupture plate more efficiently. As a result, the current supply path can be more easily destructed.

In the fourth embodiment, the cylinder 42 is closed by the bottom 43, but the present invention is not limited thereto. The bottom 43 may be omitted. In this case, a flame and pressure generated by the igniter can be controlled in one direction, and thus the rupture plate is more easily damaged and cleaved than when there is no cylinder. As a result, the current supply path can be more easily destructed.

Further, in the fifth and sixth embodiments, a gas generating agent may be mixed with the insulating materials 50 and 150. Thus, a residue of the gas generating agent or a generated gas avoids arc discharge.

Further, each of the rupture plates in the first, second, and fifth embodiments may divide the disconnecting chamber into two, and the disconnecting chamber on a side of the igniter of the divided disconnecting chambers may be sealed using a seal member or the like. Thus, the pressure generated from the igniter can be more effectively transmitted to the rupture plate, and the current supply path can be easily destructed.

Further, in the seventh embodiment, heating power of the igniter directly disconnects the bus bar. However, a substance such as ebonite may be provided on a side of the igniter where the pressure is generated, and the pressure of the driven igniter may be used to scatter the substance such as ebonite to indirectly disconnect the bus bar.

Further, in the current breaker for an aerial vehicle according to each embodiment provided with the rupture plate, a piston may be provided on a side of wiring of the rupture plate, and the piston may be pushed out by the rupture plate being ruptured when the igniter is operated to block the current (disconnect the wiring).

Further, in each of the embodiments, a line such as a parachute may be provided instead of the wiring, and the line may be disconnected when the rupture plate is ruptured when the igniter is operated. As a result, the parachute or the like can be separated as needed.

REFERENCE SIGNS LIST 10,110,210,310,410,510,610 Igniter
11,111,211,311,411,511,611 Ignition part
12,112,212,312,412,512,612 Terminal pin
20,120,220,320,420,520,620 Disconnecting chamber
21,121,221,321,421,521 Through hole
22,122,222,322,422,522 Through hole 23,123,123a,223,323,423 Rupture plate
24,124,224,324,424,524,624 Controller
25,26 Fragile part
30,130,230,330,430,530,630 Current supply path
40 Cup
41 Bottom of cup
42 Cylinder
43,143,243 Bottom of cylinder
44,144,244 Fragile part
50,150 Insulating material
100,200,300,400,500,600 Current breaker for aerial vehicle
621 Terminal board
622 Terminal

The invention claimed is:

1. A current breaker for an aerial vehicle that is used for an aerial vehicle provided with an electric device and an electric circuit having a current supply source that supplies a current to the electric device, and blocks a current supply from the current supply source to the electric device upon detection of an abnormality of the aerial vehicle, the current breaker for an aerial vehicle comprising:
   a rupture plate that disconnects a current supply path that electrically connects the electric device and the electric circuit;
   a rupture force source that damages the rupture plate by directly or indirectly applying a rupture force to the rupture plate in a direction toward the current supply path, and disconnects the current supply path by the rupture plate that has been damaged; and
   a controller that drives the rupture force source upon detection of the abnormality;
   a cup provided between the rupture force source and the rupture plate, disposed so as to cover at least a part of the rupture force source that applies the rupture force, and having a bottom,
wherein the bottom of the cup is formed into a conical shape so as to be recessed inside, and is displaced toward the rupture plate by receiving the rupture force to transmit the rupture force to the rupture plate.

2. The current breaker for an aerial vehicle according to claim 1, wherein the rupture plate is provided with one or more fragile parts.

3. The current breaker for an aerial vehicle according to claim 2, wherein
   the rupture plate is provided such that a central position of the rupture plate substantially coincides with a central axis of the rupture force source, and has a width larger than a width of the rupture force source in a length direction of the current supply path, and
   the fragile parts of the rupture plate are disposed at an eccentric position of the rupture plate.

4. The current breaker for an aerial vehicle according to claim 2, further comprising a cylinder provided between the rupture force source and the rupture plate, disposed so as to cover at least a part of the rupture force source that applies the rupture force, and having a bottom, wherein the one or more fragile parts are provided on the bottom of the cylinder.

5. The current breaker for an aerial vehicle according to claim 2, further comprising a cylinder provided between the rupture force source and the rupture plate, disposed so as to cover at least a part of the rupture force source that applies the rupture force, and having an opening at a tip of the cylinder,
   wherein the one or more fragile parts are provided on a bottom of the cylinder.

6. The current breaker for an aerial vehicle according to claim 1, wherein an insulating material is provided between the rupture plate and the current supply path.

7. The current breaker for an aerial vehicle according to claim 6, wherein the insulating material is held on a lower surface of the rupture plate.

8. The current breaker for an aerial vehicle according to claim 1, wherein the rupture force source is an igniter.

* * * * *